Aug. 30, 1932.  A. L. VEIT  1,874,662
AUTOMATIC CONTROL FOR AIR VEHICLES
Filed June 16, 1930   2 Sheets-Sheet 1
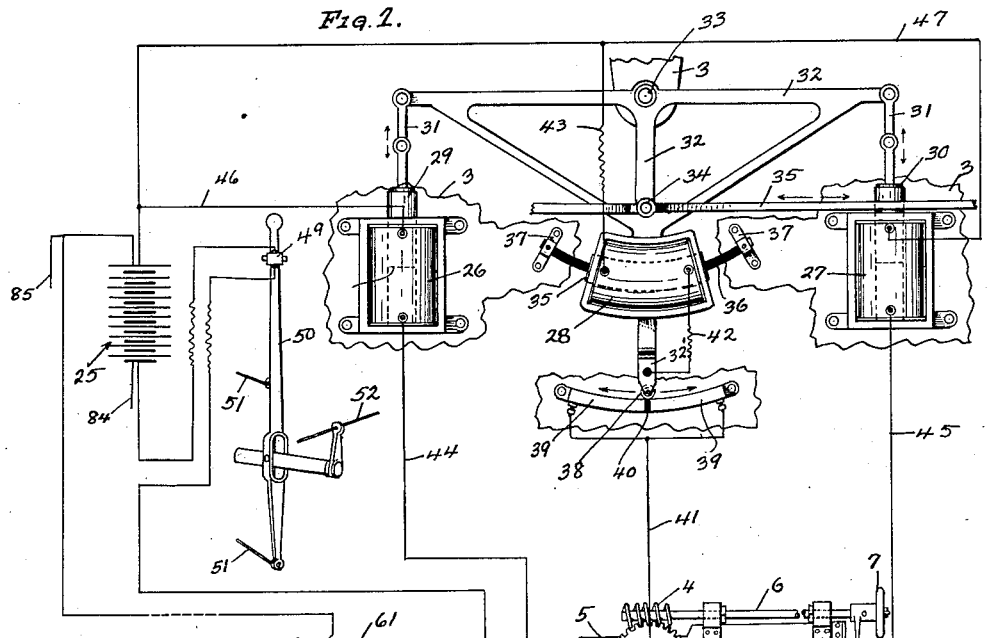
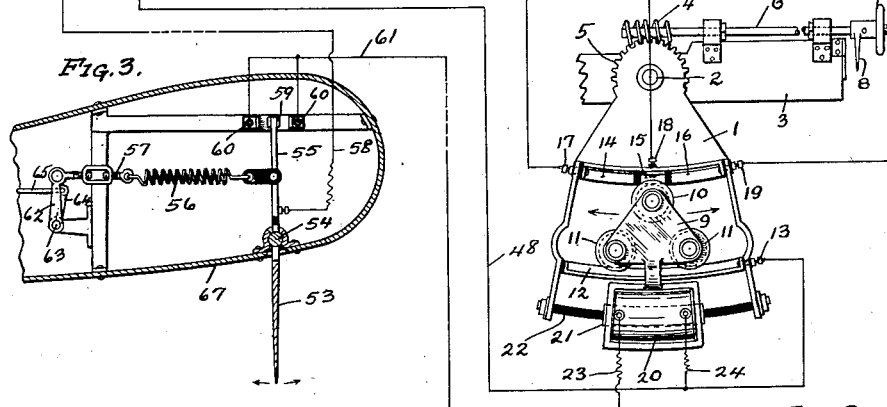
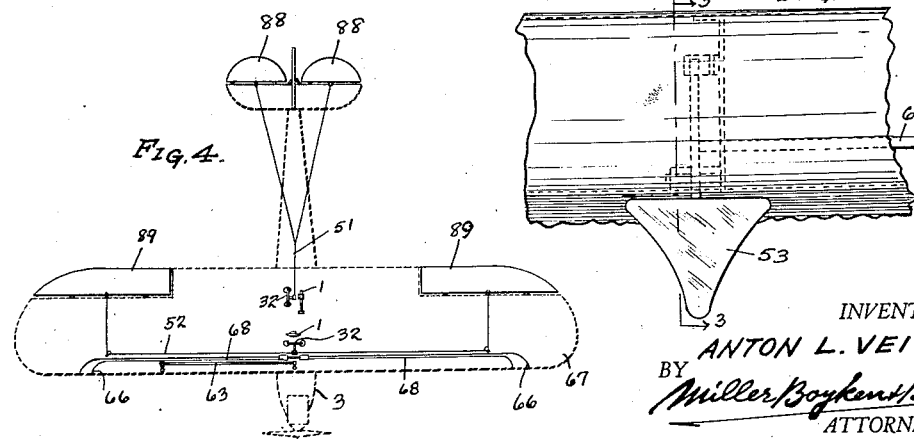
INVENTOR.
ANTON L. VEIT
BY Miller, Boykin & Bried
ATTORNEYS.

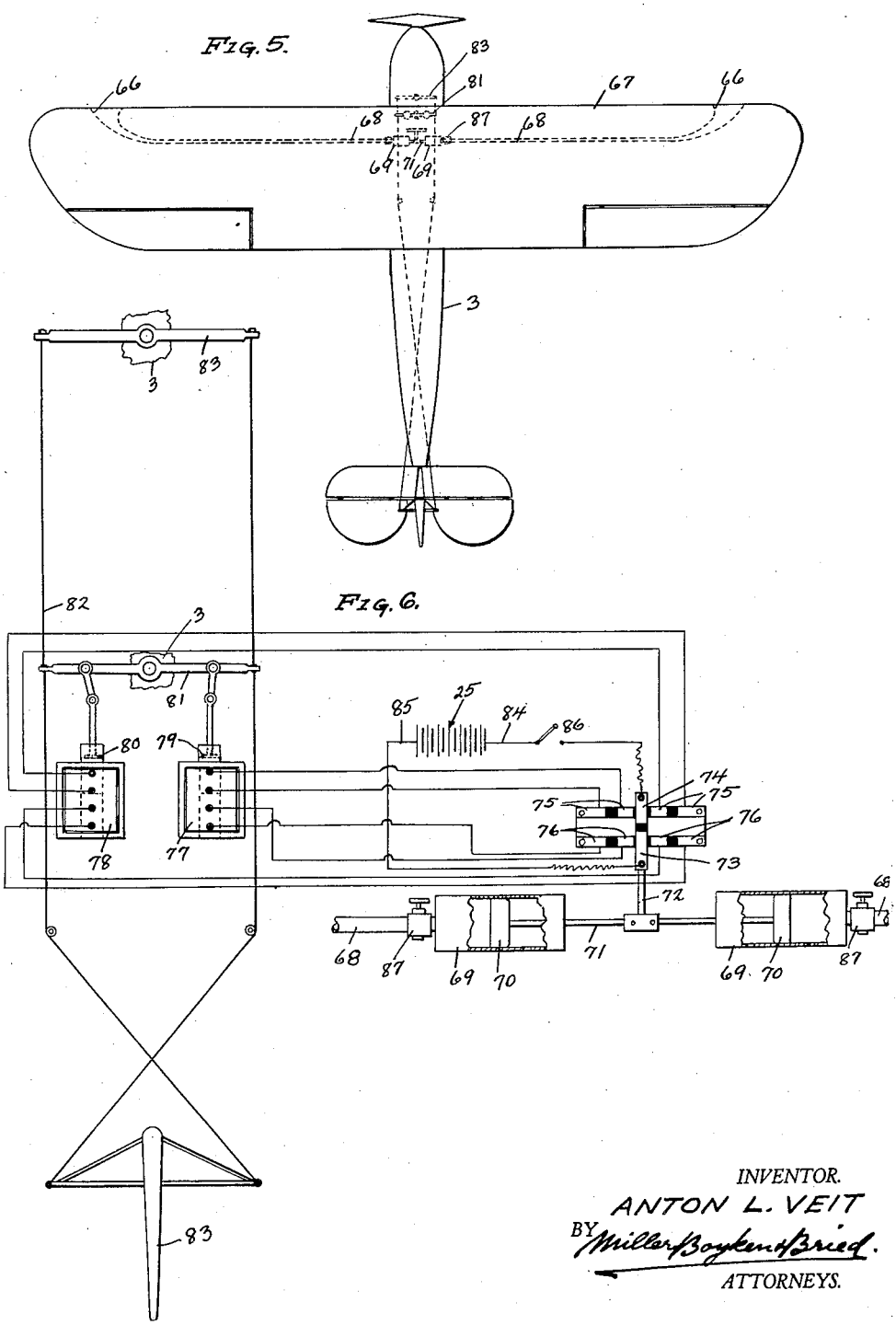

Patented Aug. 30, 1932

1,874,662

UNITED STATES PATENT OFFICE

ANTON L. VEIT, OF SAN FRANCISCO, CALIFORNIA, ASSIGNOR OF ONE-HALF TO WILLIAM WAGNER, OF SAN FRANCISCO, CALIFORNIA

AUTOMATIC CONTROL FOR AIR VEHICLES

Application filed June 16, 1930. Serial No. 461,441.

This invention relates to the automatic control of air vehicles, particularly airplanes, and has for its principal objects simplified means whereby an airplane is kept on an even keel, or will maintain a constant angle of ascent or descent, and will automatically head into the wind in taking off or in making a landing. Other objects are to provide the above automatic controls yet leaving the airplane at all times in manual control of the pilot for turning and deliverate alterations of the ascending and descending angles, tho guarding against any change of course or angle if the manual control stick is let alone.

Other objects of the invention will appear in the following description and accompanying drawings.

This application is a continuation in part of my copending application filed under Serial No. 272,007 on April 23, 1928, which is hereby abandoned, and which disclosure shows a control of the kind mentioned wherein the ailerons and elevator are automatically operated through gravity controlled switch means and reversing power means so that upon lateral tipping or longitudinal tilting of the plane out of the normal or beyond the angle for which the apparatus was set, the controls would be actuated to bring the plane at once back to normal and the controls would then immediately be returned to their central or normal position for holding the plane to its course. The difference between the prior disclosure and the present being principally in the electrical hook-up and power units used, as well as provision for avoiding detrimental action of inertia of the gravity-controlled switches which make the electrical connections for energizing the power units or prime movers which shift the controls, and also the slow speed or minimum air pressure control and means for compensating against uneven head wind or pressure.

In the accompanying drawings Fig. 1 shows one set of gravity switch apparatus and hook-up as applied to longitudinal (elevators) controls of an airplane, and in diagrammatic layout the electrical wiring and relation of the hand control stick.

Fig. 2 is a front view of a portion of the leading edge of the wing of the airplane showing a special vane which controls the inertia effect of the gravity switch as well as the ascending and descending angle of the plane.

Fig. 3 is a vertical cross section of Fig. 2 as seen from the line 3—3 thereof, and is shown in relation to the general wiring diagram of Fig. 1.

Fig. 4 is a reduced plan view showing somewhat diagrammatically the apparatus of Fig. 1 installed in duplicate, for taking care of both the lateral as well as longitudinal controls, and also indicates the inertia or slow speed and head wind controls.

Fig. 5 is an enlarged plan of the airplane showing in dotted lines the head wind control and omitting the other controls for clarity.

Fig. 6 is an enlarged plan or diagrammatic layout of the mechanical and electrical elements of the head wind control.

In further detail the drawings show in Fig. 1 the complete arrangement of units for the longitudinal control and which are duplicated for the lateral control. The control in either case being effected by a rolling carriage type of gravity switch which makes and breaks various electric circuits for energizing or de-energizing various electric solenoids directly mechanically connected to the aileron or elevator linkage.

The gravity switch comprises a frame 1 pivotally mounted at 2 on a portion 3 of the body of the aircraft and a hand-operated worm gear 4 is provided on the body for adjusting the relation of the switch frame to the vertical. This worm engages teeth 5 formed on the switch frame and is mounted on a rotatable shaft 6 provided with a hand-wheel 7 and pointer 8 so that the desired degree of adjustment may readily be obtained.

The lower part of the frame is open and provided with upper and lower curved tracks between which rolls a metal carriage 9 provided with grooved metal wheels 10, 11 engaging the tracks.

The lower track 12 is of metal insulated from the frame 1 and provided with a terminal post 13 projecting through the frame, while the upper track is composed of three metal sections 14, 15, 16 insulated from one another and from the frame as indicated and each provided with terminal posts 17, 18 and 19.

With the frame adjusted to hang vertically as shown the carriage rests centrally at the lowermost portion of the curved tracks and brings the lower track into electrical contact with upper central section 15 and upon tilting of the plane the carriage would break this connection and connect either section 14 or 16 to the lower track as the case may be.

Suspended from the carriage is a small solenoid 20 of arched form which surrounds a similarly formed solenoid core 21 carried on an insulating bar 22. The arrangement being such that as the carriage rolls back and forth it will displace the solenoid binding with reference to the core, but if the solenoid should be energized it will instantly center itself over the core and at the same time center the rolling carriage or gravity switch in contact with track segment 15.

Flexible electrical leads 23 and 24 supply current to the solenoid while permitting freedom of motion.

The track segments of the switch are wired from any suitable source of power on the aircraft such as a storage battery 25 to a set of relatively large power solenoids 26, 27, 28 for shifting the elevators 88 or ailerons 89.

Solenoids 26 and 27 are arranged vertically and secured to any convenient part of the aircraft body 3 and their slidable cores 29, 30 are linked as at 31 to the opposite ends respectively of a lever or rocker arm 32 in turn pivoted at 33 to the aircraft body 3 and which rocker is pivotally connected as at 34 with a link or links which extend through any suitable additional linkage or cords not shown to swing the control vanes, in this case the elevators up or down depending on which way the arm is rocked.

The arrangement of solenoids is such that when the elevators are in central or normal position for horizontal flight the cores will both be withdrawn somewhat from the solenoids and upon energizing of either solenoid it will draw its end of the arm down and centralize the core with the air control vane tipped as far as it is desirable for it to go under this automatic control, and which is preferably about half the angle they can be forced with the hand control.

The third solenoid 28 is of arched shape and is carried on the pivoted arm 32 while its core 35 is similarly shaped and carried on an insulating bar 36 mounted in brackets 37 secured to the body 3 of the aircraft, while the extreme lower end 32′ of the arm is insulated and carries a roller contact or brush 38 which rolls along two curved conducting strips 39, provided with an insulated gap 40 in the center upon which the roller rests when the rocker arm 32 is centrally disposed and the air controls are in central or normal position.

Solenoid 28 is connected in circuit from the gravity switch segment 15 by leads 41, 42 and thence to source of power through lead 43 as shown, while solenoids 26, 27 are respectively connected to end sections 14, 16 through leads 44, 45 and by 46, 47 to the source of power.

The lower track 12 of the gravity switch and one terminal of solenoid 20 are connected to the opposite power terminal through wire 48 by way of a common snap switch 49 located on or close to the manual control stick 50 which has suitable pull connections 51 to the elevator or either of said connections may be considered as a link to push-pull rod 35 of the automatic control, while at 52 is indicated the linkage from manual control stick to the ailerons which may be the same as rod 35 of the lateral control apparatus or linked thereto by any suitable linkage not shown. It is of course understood that the apparatus of Fig. 1 is duplicated for the lateral control of the plane or for swinging the ailerons, the only difference being that on the longitudinal control the track 12 runs longitudinally and for the lateral control transversely of the fuselage, and the handwheel worm adjustment 4, 7 is usually omitted.

Connected into the circuit for the longitudinal or elevator control only is a combined wind pressure switch and carriage inertia control switch as shown in Figs. 2 and 3 which automatically energizes solenoid 20 to hold the gravity carriage switch 9 in central position should the craft lurch into an air pocket or strike a "bump" in the air, or should the craft be traveling at an insufficient speed or one below that for which the wind pressure switch is set, so that the automatic control will be held firmly in whatever position it is adjusted and against further functioning until the speed of the craft or the wind pressure increases to make it safe for changing the angle of flight.

This speed switch comprises a small preferably triangular shaped vane 53 pivotally mounted at 54 to the forward portion of the wing 67 of the airplane at a point to be away from undue effect of the propeller, and projecting below the wing with its surface at right angles to the direction of travel of the craft so that the full effect of the wind will be against it, while extending from the pivot 54 is an arm 55 resiliently pulled backward by a tension spring 56 which is provided with adjusting bolt 57 so that the tension of the spring may be so adjusted that the vane 53 will be in the vertical position shown for any predetermined wind pressure, or a speed of travel to cause such a pressure, say 60 miles per hour, and that upon any substantial change in pressure the vane will swing backward or forward as the case may be.

The arm 55 is of conducting material or carries a conducting strip insulated from the pivot and spring as indicated and connected to a freely movable circuit wire 58 extending from the source of power, while its outer end carries a contact piece 59 adapted to alternately make contact between terminals 60 of a wire 61 completing the circuit to solenoid 20 the arrangement being that when the vane 53 is substantially in central position the solenoid 20 is de-energized so that the rolling carriage or gravity switch 9 is perfectly free to move, but upon the vane swinging either forward or backward to the extent permitted by the separation of terminals 60 it will, upon contacting either terminal at once energize the solenoid, thus should the craft meet any sudden change in air pressure, either positive or negative, which would ordinarily throw the carriage 9 forward or backward out of position with consequent operation of the elevators at the wrong time, such movement will be prevented.

Also, since increase or decrease in engine speed increases or decreases the wind pressure on vane 53 the tension of spring 56 should be varied proportionately so that the vane will remain vertical in ordinary handling of the craft, and to this end I connect the spring 56 with the engine throttle mechanism so that the tension of the spring will be automatically regulated from the throttle movement. Any ordinary linkage will do this, and in the drawing I show a crank 62 pivotally connected to the bolt 57, the crank secured to a shaft 63, and another crank 64 on the shaft pivotally connected to a rod 65 which may be pivotally connected with any moving part of the engine throttle mechanism not shown.

Another feature of my automatic control is shown best in Figs. 5 and 6 and is for keeping the craft turned into the wind as is particularly important in taking off and in making a landing.

This feature comprises a pair of spaced openings 66 in the leading edge of the wing 67 of the air plane and which openings are flared outwardly funnel-shaped and led through the wing toward the body 3 of the craft by tubes 68 terminating in a pair of air cylinders 69 provided with pistons 70 connected by a piston rod 71 carrying a switch contact arm 72 provided with two separate contact pieces 73, 74 movable from a central insulated position back and forth along a plurality of spaced contact switch sections 75, 76 wired to different sections of a pair of solenoids 77, 78 whose cores 79, 80 are linked to a rocker bar 81 connected at its ends to the tiller rope 82 for controlling the steering rudder 83 of the craft. The formed ends of the rope 82 continue on to the manual or foot control rocker arm 83 in the usual way.

Solenoids 77, 78 are wired by leads 84, 85 from the source of power 25 switched at 86 so that they may be entirely cut out if desired.

If the airplane in taking off or in making a landing, is not flying directly into the wind there will be a greater air pressure in one cylinder 69 than in the other with a result that sliding switch arm 72 will be moved to throw in one segment after the other of one of the solenoids 77 or 78 to thus turn the rudder as much as required to equalize the air pressure in both cylinders and at which time the craft will be riding squarely into the wind. Thus, with feet off of rocker 83 the craft will automatically assume the correct position for taking off or landing.

The automatic effect of the control may be modified by more or less shutting off valves 87 on air tubes 68, an especially important adjustment to provide for a fixed angular progression of the craft with respect to steady winds while in full flight.

It is of course understood that the solenoids 77, 78 may be wound in any number of sections to give the desired progressive action to the rudder.

From what has been described the automatic control of a plane equipped with the apparatus will probably be clear to anyone skilled in the art, for it will be seen that with two complete sets of solenoids and gravity switches as per Figure 1 installed in the fuselage or body of any aircraft and with the rolling gravity switch longitudinally disposed for the elevators and transversely for the ailerons, that the slightest tilt or tip of the craft will roll the carriage 9 and energize the appropriate solenoid to rock the beam 32 and tip the proper air vane to bring the ship back, and that by reason of the curved tracks just before coming entirely back the carriage will roll to center breaking the previous solenoid connection and energizing the central one 28 which will instantly swing the rocker arm and likewise the air controls to central position, so that the ship will resume its normal flight.

Since the automatic control solenoids are proportioned to move the controls but a part, say about half of their full movement, the control is gentle and free from hunting action as the controls are at once held in central position by solenoid 28 when the ship is about righted, but the manual control is at all times free to overpower the automatic control and obtain greater movement of the ailerons or elevators and will simply shove either core through the bottom of the solenoid. Though of course an aviator wishing to use the manual control with perfect freedom will break the automatic control circuit by switch 49.

One of the most valuable functions of my invention is its ability to predetermine a takeoff angle and insure that the plane will not rise until a safe speed has been attained. This is through the combined effect of vane 53 and carriage locking solenoid 20 and adjustability of switch assembly bracket 1, for if the gravity switch 1 is set for a desired angle of rise, vane 53 set for say 60 or 75 miles wind pressure, the plane in taking off cannot rise until the speed is attained and carriage 9 released. Then the moment the angle of rising becomes too great and the speed fall off one of the contacts 60 is made and the elevators flatten out so that the angle of the ship also decreases and the speed at once picks up thus maintaining the angle automatically and, if the hand control is let alone, absolutely overcoming any tendency to side-slip or tail spin.

Having thus described my improvements in automatic control for air vehicles it will be seen to be applicable to any type of aircraft provided with elevators and/or ailerons.

I claim:

1. In an airplane, means operative on the elevator for automatically controlling the angle of ascent in taking off, and means controlled by head wind pressure arranged to prevent automatic operation of said elevator until a predetermined speed of advance of the craft relative to the air has been attained.

2. In an airplane provided with an elevator, means controlled by head wind pressure arranged to restrict the operation of said elevator until a predetermined speed of advance of the craft relative to the air has been attained, said means arranged to restrict operation of the elevator when the head wind pressure increases to a predetermined pressure greater than the pressure necessary to release the controls for operation.

3. In an aircraft automatic means for operating the controls thereof comprising a source of electrical energy, a power solenoid mechanically connected to a control, a gravity switch arranged to complete a circuit from said source of electrical energy through said solenoid upon alteration of the angle of the switch to operate the control for bringing the craft back to position, magnetic means arranged for forcing said control to central position, and said switch provided with a circuit connection for energizing said magnetic means upon return of the craft toward original position.

4. In an aircraft automatic means for operating the controls thereof comprising a source of electrical energy, a power solenoid mechanically connected to a control, a gravity switch arranged to complete a circuit from said source of electrical energy through said solenoid upon alteration of the angle of the switch to operate the control for bringing the craft back to position, a second power solenoid arranged for forcing said control to central position, and said switch provided with a circuit connection for energizing said second power solenoid upon return of the craft toward original position.

5. In an aircraft, means for automatically operating the controls thereof comprising a rocker arm connected to the controls, a solenoid mechanically connected to said arm for rocking the same, and a second solenoid mechanically connected to said arm arranged upon energizing and de-energizing of the first mentioned solenoid to return said arm to original position.

6. In an aircraft, means for automatically operating the controls thereof comprising a rocker arm connected to the controls, a pair of solenoids arranged for rocking said arm in opposite directions upon energizing the solenoids respectively, and a solenoid arranged upon energizing and de-energizing of said pair of solenoids to return said arm to intermediate position.

7. In an aircraft, means for operating the controls thereof comprising electric solenoids mechanically connected to the controls for moving the same upon energizing the solenoids, a source of electric energy, and a gravity controlled switch arranged to energize said solenoids respectively upon tipping of the craft, said gravity switch including a track and a wheel mounted carriage adapted to roll thereon out of position upon tipping of the craft and electrically operated means for forcing the carriage back to position.

8. In an aircraft, electrically operated means for operating the controls thereof including a gravity switch adapted to move out of position for energizing said means in tipping of the craft, and electrically operated means for forcing said switch back to position.

9. In an aircraft, electrically operated means for operating the controls thereof including a gravity switch adapted to move out of position for energizing said means in tipping of the craft, and electrically operated means for retarding movement of said gravity switch.

10. In an aircraft, electrically operated means for operating the controls thereof including a gravity switch adapted to move out of position for energizing said means in tipping of the craft, and electrically operated means controlled by the speed of the craft relative to the air arranged for rendering said gravity switch inactive at predetermined minimum speeds.

11. In an aircraft provided with a rudder, electrically operated power means for swinging said rudder, means influenced by unequal wind pressure at opposite sides of the craft arranged to energize said power means whereby said craft will automatically head into the wind, and means independent of the manual control of the aircraft for modifying the effect of such unequal wind pressure to any desired degree whereby the craft will be automatically held at any desired angle of advance with respect to the wind.

12. In an aircraft provided with a rudder, power means for swinging said rudder comprising a rocker, an operating connection from the rocker to the rudder, a solenoid arranged to operate the rocker and an electric switch arranged for completing an electric circuit through said solenoid, and means operated by the difference in wind pressure at spaced points on the craft arranged to operate said switch.

13. In an aircraft provided with a rudder, power means for swinging said rudder comprising a rocker, an operating connection from the rocker to the rudder, a solenoid arranged to operate the rocker and an electric switch arranged for completing an electric circuit through said solenoid, air piston means operated by the difference in wind pressure at spaced points on the craft arranged to operate said switch and an air valve for varying the effect of air pressure on said piston.

14. In an airplane, a movable device exposed to the varying head wind pressure and responsive thereto, means determining the general position of said device during normal flight and wind pressures, an electrical circuit actuated by said device at other than normal wind pressures, means operative on the elevator of the airplane upon actuation of said circuit, and a connection between the means determining the general position of the device at normal flight and wind pressures and the throttle of the airplane motor for modifying the position of said device according to the speed of the motor.

ANTON L. VEIT.